US011133139B2

(12) United States Patent
Rached

(10) Patent No.: US 11,133,139 B2
(45) Date of Patent: Sep. 28, 2021

(54) USE OF 1-CHLORO-2,3,3,3-TETRAFLUOROPROPENE FOR ISOLATING OR EXTINGUISHING ELECTRIC ARCS

(71) Applicant: Arkema France, Colombes (FR)

(72) Inventor: Wissam Rached, Colombes (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/959,765

(22) PCT Filed: Mar. 14, 2019

(86) PCT No.: PCT/FR2019/050574
§ 371 (c)(1),
(2) Date: Jul. 2, 2020

(87) PCT Pub. No.: WO2019/186017
PCT Pub. Date: Oct. 3, 2019

(65) Prior Publication Data
US 2020/0365353 A1    Nov. 19, 2020

(30) Foreign Application Priority Data

Mar. 22, 2018 (FR) ..................... 1852479

(51) Int. Cl.
| H01H 3/56 | (2006.01) |
| H01H 33/22 | (2006.01) |
| H01H 33/64 | (2006.01) |
| H02B 13/055 | (2006.01) |
| H01H 33/56 | (2006.01) |
| H01B 3/56 | (2006.01) |

(52) U.S. Cl.
CPC .............. *H01H 33/22* (2013.01); *H01B 3/56* (2013.01); *H01H 33/64* (2013.01); *H02B 13/055* (2013.01); *H01H 2033/566* (2013.01)

(58) Field of Classification Search
CPC .. H01H 33/22; H01H 33/64; H01H 2033/566; H01B 3/56; H02B 13/055; H02B 7/01; H01F 27/321; C09K 3/00
USPC .................. 218/85, 97, 91; 252/68
See application file for complete search history.

(56) References Cited

U.S. PATENT DOCUMENTS

| 6,504,125 | B2 | 1/2003 | Nishitani |
| 7,250,583 | B2 | 7/2007 | Cameroni et al. |
| 8,287,752 | B2 | 10/2012 | Nappa et al. |
| 8,524,955 | B2 | 9/2013 | Poss et al. |
| 8,951,432 | B2* | 2/2015 | Boutier ............... B01F 17/0085 252/67 |
| 9,650,551 | B2* | 5/2017 | Collier ................ C09K 5/045 |
| 10,490,372 | B2 | 11/2019 | Rached |
| 2007/0096051 | A1 | 5/2007 | Nappa et al. |
| 2010/0123095 | A1* | 5/2010 | Minor ................. B01F 17/0035 252/68 |
| 2011/0144216 | A1 | 6/2011 | Hulse et al. |
| 2011/0309715 | A1 | 12/2011 | Claessens et al. |
| 2012/0104307 | A1 | 5/2012 | Bogdan et al. |
| 2012/0165578 | A1* | 6/2012 | Mahler ................. B01J 27/125 570/136 |
| 2012/0255316 | A1* | 10/2012 | Andre .................. C09K 5/044 62/98 |
| 2013/0174552 | A1 | 7/2013 | Mahmoud et al. |
| 2013/0255284 | A1 | 10/2013 | Rached |
| 2014/0190726 | A1 | 7/2014 | Kieffel et al. |
| 2014/0284516 | A1 | 9/2014 | Johnsen |
| 2015/0096312 | A1 | 4/2015 | Rached |
| 2015/0147280 | A1* | 5/2015 | Basu .................... A61K 8/046 424/45 |
| 2015/0191576 | A1 | 7/2015 | Robin |
| 2015/0197677 | A1 | 7/2015 | Kontomaris |
| 2016/0031773 | A1* | 2/2016 | Bonnet ................. C07C 21/18 252/182.12 |
| 2017/0069407 | A1* | 3/2017 | Johnson .............. B01D 53/002 |
| 2018/0247779 | A1 | 8/2018 | Rached |

FOREIGN PATENT DOCUMENTS

| CN | 102460604 A | 5/2012 |
| CN | 104220553 A | 12/2014 |
| EP | 1724802 A2 | 11/2006 |
| EP | 2 613 026 A2 | 7/2013 |
| FR | 2955970 A1 | 8/2011 |
| FR | 2975818 A1 | 11/2012 |
| FR | 2983341 A1 | 5/2013 |
| FR | 2986102 A1 | 7/2013 |
| FR | 2 989 084 | 10/2013 |
| FR | 3027154 A1 | 4/2016 |
| WO | 2009049144 A2 | 4/2009 |
| WO | 2011073934 A1 | 6/2011 |
| WO | 2012038443 A1 | 3/2012 |
| WO | 2012160158 A1 | 11/2012 |
| WO | 2013004796 A1 | 1/2013 |
| WO | 2013041695 A1 | 3/2013 |
| WO | 2013136015 A1 | 9/2013 |
| WO | WO 2016/059075 A1 | 4/2016 |
| WO | 2017037360 A1 | 3/2017 |

OTHER PUBLICATIONS

International Search Report (PCT/ISA/210) dated Sep. 24, 2019, by the European Patent Office as the International Searching Authority for International Application No. PCT/FR2019/050574.
Written Opinion (PCT/ISA/237) dated Sep. 24, 2019, by the European Patent Office as the International Searching Authority for International Application No. PCT/FR2019/050574.
McCarthy, Gina, Administrator, et al, "EPA Environmental Protection Agency 40 CFR Part 98 [EPA-HQ-OAR-2009-0927; FRL-9913-03-OAR] RIN 2060-AS28 Greenhouse Gas Reporting Program: Addition of Global Warming Potentials," Jul. 24, 2014, XP055198786, http://www.epa.gov/ghqreporting/documents/pdf/2014/documents/F-GHG-GWP-Rule_072414.pdf; Published in Federal Register, vol. 79, No. 147, Jul. 31, 2014, pp. 44332-44351, USA.

* cited by examiner

*Primary Examiner* — William A Bolton
(74) *Attorney, Agent, or Firm* — Buchanan Ingersoll & Rooney P.C.

(57) ABSTRACT

The use of a gas as a medium for electrically isolating and/or extinguishing electric arcs, the gas including 1-chloro-2,3,3,3-tetrafluoropropene. Also, an electrical device including a sealed chamber containing electrical components and a gas for electrically isolating and/or extinguishing electric arcs, in which the gas includes 1-chloro-2,3,3,3-tetrafluoropropene. The gas may be only 1-chloro-2,3,3,3-tetrafluoropropene.

18 Claims, No Drawings

USE OF 1-CHLORO-2,3,3,3-TETRAFLUOROPROPENE FOR ISOLATING OR EXTINGUISHING ELECTRIC ARCS

FIELD OF THE INVENTION

The present invention relates to a gas used for the electrical insulation or the extinguishing of electric arcs and also to electric appliances provided with a chamber containing this gas.

TECHNICAL BACKGROUND

In medium- or high-voltage electrical appliances, the electrical insulation and, if appropriate, the extinguishing of the electric arcs are typically provided by a gas which is confined inside a chamber of these appliances. Currently, the gas which is most often used is sulfur hexafluoride ($SF_6$): this gas exhibits a relatively high dielectric strength, a good thermal conductivity and relatively low dielectric losses. It is chemically inert and nontoxic to man and animals, and, after having been dissociated by an electric arc, it rapidly and virtually completely recombines. Furthermore, it is nonflammable and its cost is, even today, moderate.

However, $SF_6$ has the major disadvantage of exhibiting a global warming potential (GWP) of 22 800 (relative to $CO_2$ over 100 years) and a residence time in the atmosphere of 3 200 years, which places it among the gases having a high greenhouse effect power.

Manufacturers are thus looking for alternatives to $SF_6$. Hybrid systems have been provided, which systems combine gas insulation with solid insulation (document EP 1 724 802). However, this increases the size of the electric appliances, in comparison with that allowed by insulation with $SF_6$, and the cutting in oil or vacuum requires a recasting of the items of equipment.

The use is known, alternatively to $SF_6$, of "simple" gases, such as air or nitrogen, which do not have a negative impact on the environment. However, these exhibit a much lower dielectric strength than that of $SF_6$; their use for the electrical insulation and/or the extinguishing of electric arcs in high-voltage/medium-voltage appliances involves drastically increasing the volume and/or the filling pressure of these appliances, which runs counter to efforts which have been made in recent decades to develop compact electrical appliances which are increasingly less bulky.

Perfluorocarbons exhibit, generally, advantageous dielectric strength properties but their GWP typically comes within a range extending from 5000 to 10 000.

Other promising alternatives from an electrical and GWP characteristics viewpoint, such as trifluoroiodomethane, are categorized among category-3 carcinogenic, mutagenic and reprotoxic substances, which is totally unacceptable for use on an industrial scale.

Mixtures of $SF_6$ and of other gases, such as nitrogen and nitrogen dioxide, are used to limit the impact of $SF_6$ on the environment: see, for example, document WO 2009/049144. Nevertheless, as a result of the high GWP of $SF_6$, the GWP of these mixtures remains very high. Thus, for example, a mixture of $SF_6$ and nitrogen in a ratio by volume of 10/90 exhibits a dielectric strength in alternating voltage (50 Hz) equal to 59% of that of $SF_6$ but its GWP is of the order of 8000 to 8650. Such mixtures thus cannot be used as gas having a low environmental impact.

Document FR 2 955 970 provides for the use of fluoroketones in the gas state for electrical insulation. Fluoroketones can be combined with a carrier gas or dilution gas (for example nitrogen, air, nitrous oxide, carbon dioxide, oxygen, helium and the like).

Document FR 2 975 818 provides a mixture of octofluorobutan-2-one and carrier gas as insulation medium.

Document FR 2 983 341 provides for the use of polyfluorinated oxiranes as electrical insulation and/or extinguishing gas for electric arcs.

Document FR 2 986 192 provides for the use of a combination of polyfluorinated oxirane and hydrofluoroolefin as electrical insulation gas. The hydrofluoroolefins mentioned are 1,3,3,3-tetrafluoropropene (HFO-1234ze), 2,3,3,3-tetrafluoropropene (HFO-1234yf) and 1,2,3,3,3-pentafluoropropene (HFO-1225ye).

Document WO 2012/038443 provides for the use of a mixture of $SF_6$ and fluoroketone as electrical insulation gas.

Document WO 2012/160158 provides for the use of a mixture of decafluoro-2-methylbutan-3-one and a carrier gas as electrical insulation gas.

Document WO 2013/004796 provides for the use of a gas based on hydrofluoroolefin as electrical insulation gas. The hydrofluoroolefins more particularly provided are 1,3,3,3-tetrafluoropropene (HFO-1234ze) and 2,3,3,3-tetrafluoropropene (HFO-1234yf).

Document WO 2013/041695 provides for the use of a mixture of hydrofluoroolefin and fluoroketone as electrical insulation gas. The hydrofluoroolefins more particularly provided are 1,3,3,3-tetrafluoropropene (HFO-1234ze), 2,3,3,3-tetrafluoropropene (HFO-1234yf) and 1,2,3,3,3-pentafluoropropene (HFO-1225ye).

Document WO 2013/136015 provides for the use of a mixture of hydrofluoroolefin and hydrofluorocarbon as electrical insulation gas. The hydrofluoroolefins more particularly provided are 1,3,3,3-tetrafluoropropene (HFO-1234ze), 2,3,3,3-tetrafluoropropene (HFO-1234yf) and 1,2,3,3,3-pentafluoropropene (HFO-1225ye). The hydrofluorocarbons more particularly provided are 1,1,1,2,3,3,3-heptafluoropropane (HFC-227ea), pentafluoroethane (HFC-125) and 1,1,1,2-tetrafluoroethane (HFC-134a).

Document WO 2017/037360 provides for the use of hexafluorobutenes as gas for the electrical insulation and/or the extinguishing of electric arcs.

There still exists a need to develop electrical insulation and/or extinguishing media for electric arcs exhibiting both a low GWP and exhibiting a high dielectric strength.

SUMMARY OF THE INVENTION

The invention relates first to the use of a gas as electrical insulation and/or extinguishing medium for electric arcs, wherein the gas comprises 1-chloro-2,3,3,3-tetrafluoropropene.

In embodiments, the 1-chloro-2,3,3,3-tetrafluoropropene comprises more than 80 mol % of 1-chloro-2,3,3,3-tetrafluoropropene in Z form, preferably more than 90 mol % of 1-chloro-2,3,3,3-tetrafluoropropene in Z form, more preferably more than 95 mol % of 1-chloro-2,3,3,3-tetrafluoropropene in Z form and more preferably more than 99 mol % of 1-chloro-2,3,3,3-tetrafluoropropene in Z form.

In embodiments, the gas is used as electrical insulation and/or extinguishing medium for electric arcs in a medium-voltage electrical substation appliance.

In embodiments, the gas contains from 10 to 100 mol % of 1-chloro-2,3,3,3-tetrafluoropropene, preferably from 15 to 75 mol % and more particularly from 19 to 45 mol %.

In embodiments, the gas also comprises a diluant, preferably chosen from air, nitrogen, methane, oxygen, carbon dioxide or a mixture thereof, and the gas is preferably a binary mixture of 1-chloro-2,3,3,3-tetrafluoropropene and a diluant.

In embodiments, the gas also comprises a halogenated compound, preferably a fluorinated compound, more preferably chosen from fluoroketones, hydrofluoroolefins, hydrochlorofluoroolefins and combinations thereof.

In embodiments, the gas is used in a temperature range of which the lower limit is from −30 to 30° C., preferably from −20 to 25° C., more preferably from −15 to 20° C. and more preferably from −10 to 10° C.

In embodiments, the gas essentially consists, and preferably consists of 1-chloro-2,3,3,3-tetrafluoropropene.

In embodiments, the gas is used in a temperature range of which the lower limit is greater than or equal to 10° C., or to 11° C., or to 12° C., or to 13° C., or to 14° C., or to 15° C., or to 16° C., or to 18° C., or to 20° C.

The invention also relates to an electrical appliance comprising a leaktight chamber in which electrical components and also an electrical insulation and/or extinguishing gas for electric arcs are found, wherein the gas comprises a 1-chloro-2,3,3,3-tetrafluoropropene.

In embodiments, the 1-chloro-2,3,3,3-tetrafluoropropene comprises more than 80 mol % of 1-chloro-2,3,3,3-tetrafluoropropene in Z form, preferably more than 90 mol % of 1-chloro-2,3,3,3-tetrafluoropropene in Z form, more preferably more than 95 mol % of 1-chloro-2,3,3,3-tetrafluoropropene in Z form and more preferably more than 99 mol % of 1-chloro-2,3,3,3-tetrafluoropropene in Z form.

In embodiments, the gas also comprises a diluant, preferably chosen from air, nitrogen, methane, oxygen, carbon dioxide or a mixture thereof, and the gas is preferably a binary mixture of 1-chloro-2,3,3,3-tetrafluoropropene and a diluant.

In embodiments, the gas also comprises a halogenated compound, preferably a fluorinated compound, more preferably chosen from fluoroketones, hydrofluoroolefins, hydrochlorofluoroolefins and combinations thereof.

In embodiments, the gas essentially consists, and preferably consists of 1-chloro-2,3,3,3-tetrafluoropropene.

In embodiments, the electrical appliance is a medium-voltage electrical appliance.

In embodiments, the electrical appliance is a high-voltage electrical appliance.

In embodiments, the gas is at a pressure, at 20° C., of 0.1 to 1 MPa, preferably of 0.11 to 0.5 MPa and more preferably of 0.12 to 0.15 MPa.

In embodiments, the appliance is chosen from a gas-insulated electrical transformer, a gas-insulated line for the transportation or the distribution of electricity, and an electrical connection/disconnection appliance.

The present invention makes it possible to overcome the drawbacks of the prior art. It more particularly provides electrical insulation and/or extinguishing media for electric arcs exhibiting both a low GWP and exhibiting a high dielectric strength.

This is accomplished by virtue of the discovery that the media based on 1-chloro-2,3,3,3-tetrafluoropropene, or HCFO-1224yd, exhibit noteworthy dielectric strength properties and that, as a mixture with inert compounds, they provide an effective electrical insulation even at relatively low temperature.

DESCRIPTION OF EMBODIMENTS OF THE INVENTION

The invention is now described in greater detail and in a nonlimiting manner in the description that follows.

The invention relates to a gas used as electrical insulation and/or extinguishing medium for electric arcs.

The gas according to the invention comprises at least 1-chloro-2,3,3,3-tetrafluoropropene or HCFO-1224yd. The HCFO-1224yd can be in the E form or in the Z form or can be a mixture of the two forms. The Z form is preferred.

Preferably, HCFO-1224yd comprises more than 50 mol % of the Z form, preferably more than 60 mol % of the Z form, preferably more than 70 mol % of the Z form, preferably more than 80 mol % of the Z form, preferably more than 85 mol % of the Z form, preferably more than 90 mol % the Z form, preferably more than 95 mol % of the Z form, preferably more than 98 mol % of the Z form, and more preferably more than 99 mol % of the Z form.

Preferably, the HCFO-1224yd essentially consists or consists of HCFO-1224yd(Z).

HCFO 1224yd(Z) is nonflammable.

HCFO 1224yd(Z) has a very low level of toxicity.

HCFO 1224yd(Z) is thermally stable and compatible with elastomers and plastics.

The gas can also comprise additional compounds, in particular a diluant (or dilution gas or buffer gas) and optionally one or more other halogenated compounds (in particular fluorinated compounds).

In embodiments, the gas according to the invention essentially consists, and preferably consists of HCFO-1224yd.

In embodiments, the gas according to the invention comprises (or optionally consists essentially of, or optionally consists of) a binary mixture of HCFO-1224yd and a diluant.

In embodiments, the gas according to the invention comprises (or optionally consists essentially of, or optionally consists of) a binary mixture of HCFO-1224yd and another halogenated compound.

In embodiments, the gas according to the invention comprises (or optionally consists essentially of, or optionally consists of) a mixture of HCFO-1224yd, another halogenated compound and a diluant.

The diluant is an inert compound which can, for example, be chosen from air, nitrogen, methane, oxygen, nitrous oxide, helium and carbon dioxide. Mixtures thereof are also possible.

Mention may in particular be made, as halogenated compound which can be used as a mixture with HCFO-1224yd, of a chlorocarbon, a hydrochlorocarbon, a chlorofluorocarbon, a hydrochlorofluorocarbon, a chloroolefin, a hydrochloroolefin, a chlorofluoroolefin or a hydrochlorofluoroolefin, a hydrochlorofluoroketone, a fluoroketone, a hydrofluoroketone, a hydrochloroketone or a chloroketone. Preferably, the halogenated compound is a hydrochlorofluoroolefin, a hydrofluoroolefin or a fluoroketone.

In embodiments, the halogenated compound is a fluorinated compound which is preferably chosen from fluoroketones, fluoroethers, fluoronitriles, fluorinated peroxides, fluoroamides and fluorinated ether oxides.

Decafluoro-2-methylbutan-3-one is an example of a preferred halogenated compound. 2,3,3,3-Tetrafluoro-2-(trifluoromethyl)propanenitrile is an example of a preferred fluoronitrile compound. 1,1,1,4,4,4-hexafluorobut-2-ene (E) is an example of a preferred hydrofluoroolefin compound.

It is preferably desired for the gas according to the invention not to undergo condensation for the whole of the projected operating temperature range. It is furthermore desired to use this gas at a sufficiently high pressure, in principle greater than $10^5$ Pa. Under these conditions, the use of a diluant makes it possible to avoid reaching the saturated vapor pressure of the HCFO-1224yd and of the other halogenated compounds optionally present in the whole of the projected operating temperature range.

Thus, a diluant is generally a compound exhibiting a boiling point which is lower than that of HCFO-1224yd and also exhibiting a lower electric strength (at a reference temperature which is, for example, 20° C.).

The operating absolute pressure of the gas according to the invention is preferably from 1 to 1.5 bar in the medium-voltage appliances and from 4 to 7 bar in the high-voltage appliances.

The terms "medium-voltage" and "high-voltage" are used here as normally accepted, namely that the term "medium-voltage" denotes a voltage which is greater than 1000 volts in alternating current and than 1500 volts in direct current but which does not exceed 52 000 volts in alternating current and 75 000 volts in direct current, while the term "high-voltage" denotes a voltage which is strictly greater than 52 000 volts in alternating current and than 75 000 volts in direct current.

In order to maximize the amount of HCFO-1224yd and of the other optional halogenated compounds, the following formula can be used:

$$P_{tot} = \frac{\sum_{i=1}^{N} P_i}{\sum_{i=1}^{N} \frac{P_i}{PVS_i}} + P_{dilution\ gas}$$

In this formula, $P_{tot}$ represents the operating pressure of the gas according to the invention, $P_i$ represents the partial pressure of the HCFO-1224yd and of the other halogenated compounds and $PVS_i$ represents the saturated vapor pressure of the HCFO-1224yd and of the other halogenated compounds. The pressures are given at the filling temperature, i.e. generally approximately 20° C.

The molar percentage of each compound is then approximately given by $M_i=(P_i/P_{tot})\times 100$.

However, it should be noted that, in some cases, it is possible to accept a small amount of liquid at low temperature, which can make it possible to use the HCFO-1224yd or the other halogenated compounds in amounts slightly greater than those defined above.

In general, the gas according to the invention can be used in a temperature range of which the lower limit has a value: from −30 to −25° C.; or from −25 to −20° C.; or from −20 to −15° C.; or from −15 to −10° C.; or from −10 to 5° C.; or from −5 to 0° C.; or from 0 to 5° C.; or from 5 to 10° C.; or from 10 to 15° C.; or from 15 to 20° C.; or from 20 to 25° C.; or from 25 to 30° C.

In certain embodiments, the gas may be used in a temperature range of which the lower limit is from −30 to 30° C., preferably from −20 to 25° C., more preferably from −15 to 20° C. and more preferably from −10 to 10° C.

The gas according to the invention can be used in a temperature range of which the upper limit has a value: from 15 to 20° C.; or from 20 to 25° C.; or from 25 to 30° C.; or from 30 to 35° C.; or from 35 to 40° C.; or from 40 to 45° C.; or from 45 to 50° C.

In certain embodiments, the gas may be used in a temperature range of which the upper limit is from 15 to 50° C., preferably from 25 to 45° C., more preferably from 20 to 40° C. and more preferably from 25 to 35° C.

The operating temperature of the gas corresponds to the effective temperature of the gas during use thereof; it can vary during use, but remains between the lower limit and the upper limit defined above. For example, when the gas is present in the chamber of an electrical apparatus, the operating temperature is the temperature of the gas in the chamber, which can vary over time as a function in particular of the climatic or environmental conditions.

The embodiments in which a diluant gas is present make it possible generally to operate in a temperature range, the lower limit of which is lower than in the embodiments in which no diluant gas is present.

Thus, when the gas consists essentially of, or consists of, an HCFO-1224yd (and preferably HCFO-1224yd(Z)), the lower limit of the temperature range is preferably greater than or equal to 10° C., or greater than or equal to 11° C., or greater than or equal to 12° C., or greater than or equal to 13° C., or greater than or equal to 14° C., or greater than or equal to 15° C., or greater than or equal to 16° C., or greater than or equal to 18° C., or greater than or equal to 20° C.

Preferably, the gas according to the invention exhibits a GWP of less than or equal to 20, more particularly of less than or equal to 15 or of less than or equal to 10, or of less than or equal to 7, or of less than or equal to 5, or of less than or equal to 4, or of less than or equal to 3.

The GWP is defined with respect to carbon dioxide and with respect to a period of time of 100 years, according to the method shown in "The Scientific Assessment of Ozone Depletion, 2002, A Report of the World Meteorological Association's Global Ozone Research and Monitoring Project".

The (molar) proportion of HCFO-1224yd (and preferably of HCFO-1224yd(Z)) in the gas can be, in some embodiments, from 1 to 2%; or from 2 to 3%; or from 3 to 4%; or from 4 to 5%; or from 5 to 6%; or from 6 to 7%; or from 7 to 8%; or from 8 to 9%; or from 9 to 10%; or from 10 to 12%; or from 12 to 14%; or from 14 to 16%; or from 16 to 18%; or from 18 to 20%; or from 20 to 22%; or from 22 to 24%; or from 24 to 26%; or from 26 to 28%; or from 28 to 30%; or from 30 to 35%; or from 35 to 40%; or from 40 to 45%; or from 45 to 50%; or from 50 to 55%; or from 55 to 60%; or from 60 to 70%; or from 70 to 80%; or from 80 to 90%; or from 90 to 100%.

In certain embodiments, the gas can contain from 10 to 100 mol % of HCFO-1224yd, preferably from 15 to 75 mol % a more particularly from 19 to 45 mol %.

In certain embodiments, the gas is used with a minimum temperature (lower limit of the operating temperature range) included in the following ranges, in combination with a proportion of HCFO-1224yd (and preferably of HCFO-1224yd(Z)) in the gas which lies in the following ranges (in order to obtain maximum performance levels):

| Minimum temperature | Proportion of HCFO-1224yd |
| --- | --- |
| ≥−20° C. | ≥19 mol % |
| ≥−15° C. | ≥25 mol % |
| ≥10° C. | ≥75 mol % |
| ≥17° C. | 100 mol % |

The partial pressure of HCFO-1224yd in the gas at 20° C. can be, in some embodiments, from 0.002 to 0.004 MPa; or from 0.004 to 0.006 MPa; or from 0.006 to 0.008 MPa; or from 0.008 to 0.01 MPa; or from 0.01 to 0.012 MPa; or from 0.012 to 0.014 MPa; or from 0.014 to 0.016 MPa; or from 0.016 to 0.018 MPa; or from 0.018 to 0.02 MPa; or from 0.02 to 0.022 MPa; or from 0.022 to 0.024 MPa; or from 0.024 to 0.026 MPa; or from 0.026 to 0.028 MPa; or from 0.028 to 0.03 MPa; or from 0.03 to 0.032 MPa; or from 0.032 to 0.034 MPa; or from 0.034 to 0.036 MPa; or from 0.036 to 0.038 MPa; or from 0.038 to 0.04 MPa; or from 0.04 to 0.045 MPa; or from 0.045 to 0.05 MPa; or from 0.05 to 0.055 MPa; or from 0.055 to 0.06 MPa; or from 0.06 to 0.07 MPa; or from 0.07 to 0.08 MPa; or from 0.08 to 0.09 MPa; or from 0.09 to 0.1 MPa; or from 0.1 to 0.11 MPa; or from 0.11 to 0.12 MPa; or from 0.12 to 0.13 MPa; or of more than 0.13 MPa.

The gas can have a pressure, at 20° C., of 0.1 to 1 MPa, preferably of 0.11 to 0.5 MPa and more preferably of 0.12 to 0.15 MPa.

In certain embodiments, the gas can have a pressure, at 20° C., of from 0.1 to 0.15 MPa; or from 0.15 to 0.3 MPa; or from 0.3 to 0.5 MPa; or from 0.5 to 0.7 MPa; or from 0.7 to 0.9 MPa; of from 0.9 to 1 MPa.

It is desirable for the electrical appliances to contain a relatively high amount of HCFO-1224yd (and optionally other halogenated and in particular fluorinated gases), in order for the dielectric, thermal and cutoff characteristics of the gases to be sufficient over the prescriptive or desired temperature range.

To do this, it is advantageous to use a heating device in combination with an electrical appliance, said heating device being triggered as a function of the temperature of the gas mixture, of its pressure or of its density.

For example, a heating resistance ideally placed at the lowest point of the appliance (point of convergence of the liquids condensed on the different parts inside the appliance, by gravitation) can be used.

A gas pressure greater than the test pressure (gas pressure in the appliance during the validation tests) defined by standard(s) is thus guaranteed.

For the same reasons, it is advantageous to provide thermal insulation of the walls of the appliance and/or thermal insulation of the plant or of the premises containing it and/or heating of this installation or of these premises.

EXAMPLES

The examples that follow illustrate the invention without limiting it.

Example 1—Pure Products

Dielectric strength measurements are carried out at 20° C. and at 1.3 bar in a homogeneous field, with an interelectrode distance of 12 mm.

The results are as follows, expressed in a relative manner as percentage of the dielectric strength of the reference gas $SF_6$:

HCFO-1224yd(Z): 178%.

Given its condensation temperature, HCFO-1224yd(Z) can be used in the pure state at a minimum temperature of 17° C., at a pressure of 1.14 bar, without condensation. Its dielectric strength values (with an interelectrode distance of 12 mm) is then as follows, still with respect to $SF_6$:

HCFO-1224yd(Z) at 17° C.: 159%.

Example 2—Mixtures with an Inert Compound

If the ideal gas model is used, 1 m³ of gas at 1.3 bar and at 20° C. contains 53.33 moles, independently of the gas used. This same amount of gas, in the same volume, gives a pressure of 1.144 bar at −15° C.

Still according to the ideal gas theory, each gas is considered independently of the other gases in the same volume. Thus, as the saturated pressure of HCFO-1224yd(Z) at −15° C. is 0.29 bar, the maximum number of moles in 1 m³ of gas is 13.5 moles, if it is desired to avoid any condensation at this temperature.

As the total pressure is regarded as being equal to the sum of the partial pressures, the remaining pressure is 0.85 bar and the equivalent number of moles of inert compound to be added is 39.8. The HCFO-1224yd(Z)/inert compound mixture then comprises a molar composition of 25.3% of HCFO-1224yd and 74.7% of inert compound.

As the dielectric strength of air is 54% of that of $SF_6$ at −15° C. and at 1.14 bar, it is possible to calculate the dielectric strength of the above binary mixture under the same conditions:

25.3 mol % HCFO-1224yd(Z)+74.7 mol % air: 78%.

These results show that, at the temperature of −15° C., a mixture of inert compound and HCFO-1224yd(Z) improves the dielectric performance qualities of the inert compound. What is true for air is also true for $CO_2$, the dielectric strength of which is 51% of that of $SF_6$ at −15° C. and at 1.14 bar.

The HCFO-1224yd(Z) contents shown above were calculated according to the ideal gas theory.

However, in reality, the maximum content of HCFO-1224yd(Z) at vapor saturation at the temperature of −15° C. and at the pressure of 1.14 bar is greater than that predicted by the ideal gas theory. Thus, the HCFO-1224yd(Z)/inert compound binary compositions of interest can comprise a greater HCFO-1224yd(Z) content than the values shown above. Correspondingly, the dielectric strength obtained can be greater than that calculated above.

The invention claimed is:

1. A method of using a gas as electrical insulation and/or extinguishing medium for electric arcs, wherein the gas comprises 1-chloro-2,3,3,3-tetrafluoropropene, wherein the gas is at a pressure, at 20° C., of 0.1 to 1 MPa.

2. The method as claimed in claim 1, wherein the 1-chloro-2,3,3,3-tetrafluoropropene comprises more than 80 mol % of 1-chloro-2,3,3,3-tetrafluoropropene in Z form.

3. The method as claimed in claim 1, as electrical insulation and/or extinguishing medium for electric arcs in a medium-voltage electrical substation appliance.

4. The method as claimed in claim 1, wherein the gas contains from 10 to 100 mol % of 1-chloro-2,3,3,3-tetrafluoropropene.

5. The method as claimed in claim 1, wherein the gas also comprises a diluant, and the gas is a binary mixture of 1-chloro-2,3,3,3-tetrafluoropropene and the diluant.

6. The method as claimed in claim 1, wherein the gas also comprises a halogenated compound.

7. The method as claimed in claim 1, in a temperature range of which a lower limit is from −30 to 30° C.

8. The method as claimed in claim 1, wherein the gas consists essentially of 1-chloro-2,3,3,3-tetrafluoropropene.

9. The method as claimed in claim 8, in a temperature range of which a lower limit is greater than or equal to 10° C.

10. An electrical appliance comprising a leaktight chamber in which electrical components and also an electrical insulation and/or extinguishing gas for electric arcs are found, wherein the gas comprises a 1-chloro-2,3,3,3-tetrafluoropropene, wherein the gas is at a pressure, at 20° C., of 0.1 to 1 MPa.

11. The electrical appliance as claimed in claim 10, wherein the 1-chloro-2,3,3,3-tetrafluoropropene comprises more than 80 mol % of 1-chloro-2,3,3,3-tetrafluoropropene in Z form.

12. The electrical appliance as claimed in claim 10, wherein the gas also comprises a diluant, and the gas is a binary mixture of 1-chloro-2,3,3,3-tetrafluoropropene and the diluant.

13. The electrical appliance as claimed in claim 10, wherein the gas also comprises a halogenated compound.

14. The electrical appliance as claimed in claim 10, wherein the gas consists essentially of 1-chloro-2,3,3,3-tetrafluoropropene.

15. The electrical appliance as claimed in claim 10, wherein the electrical appliance is a medium-voltage electrical appliance.

16. The electrical appliance as claimed in claim 10, wherein the electrical appliance is a high-voltage electrical appliance.

17. The electrical appliance as claimed in claim 10, wherein the gas is at a pressure, at 20° C., of 0.1 to 0.5 MPa.

18. The electrical appliance as claimed in claim 10, which is chosen from a gas-insulated electrical transformer, a gas-insulated line for transportation or distribution of electricity, and an electrical connection/disconnection appliance.

\* \* \* \* \*